Feb. 1, 1944.  A. B. STOREY, JR., ET AL  2,340,286
TANK FILLER UNIT
Filed April 22, 1940  2 Sheets—Sheet 1
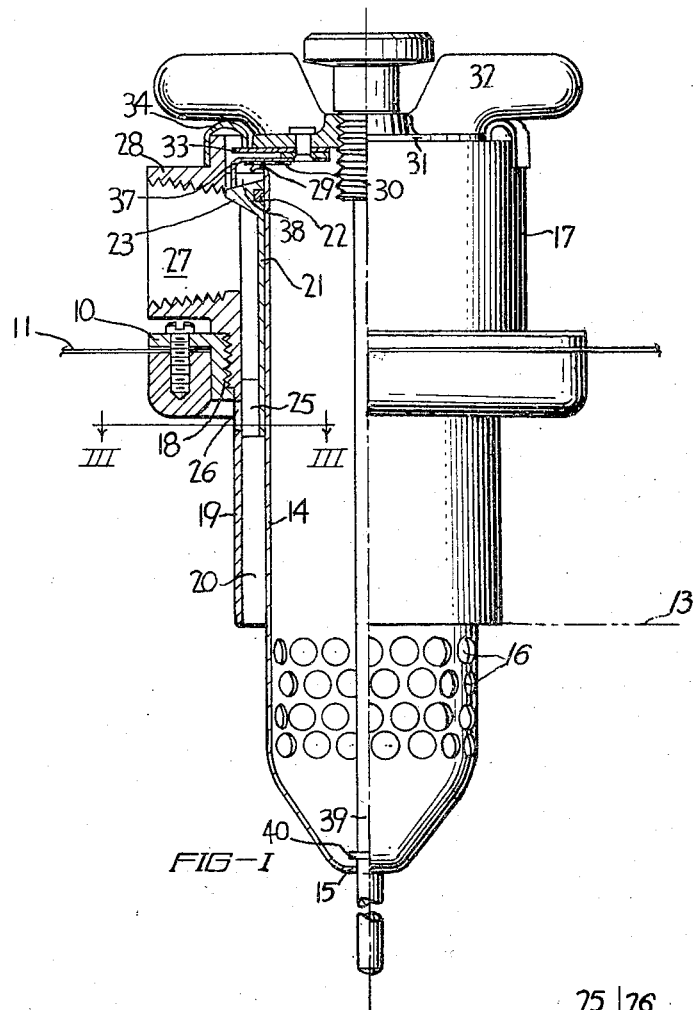
FIG-I
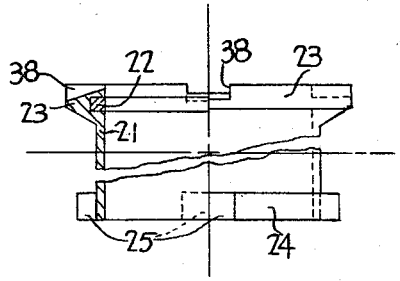
FIG-II
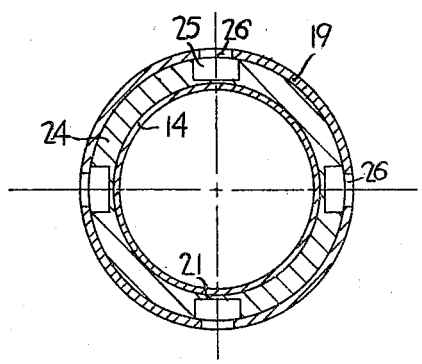
FIG-III
INVENTOR
Alonzo B. Storey Jr.
John C. Duyendack Jr.

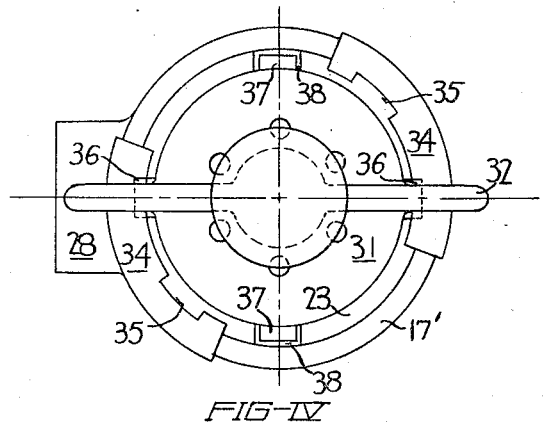
FIG-IV
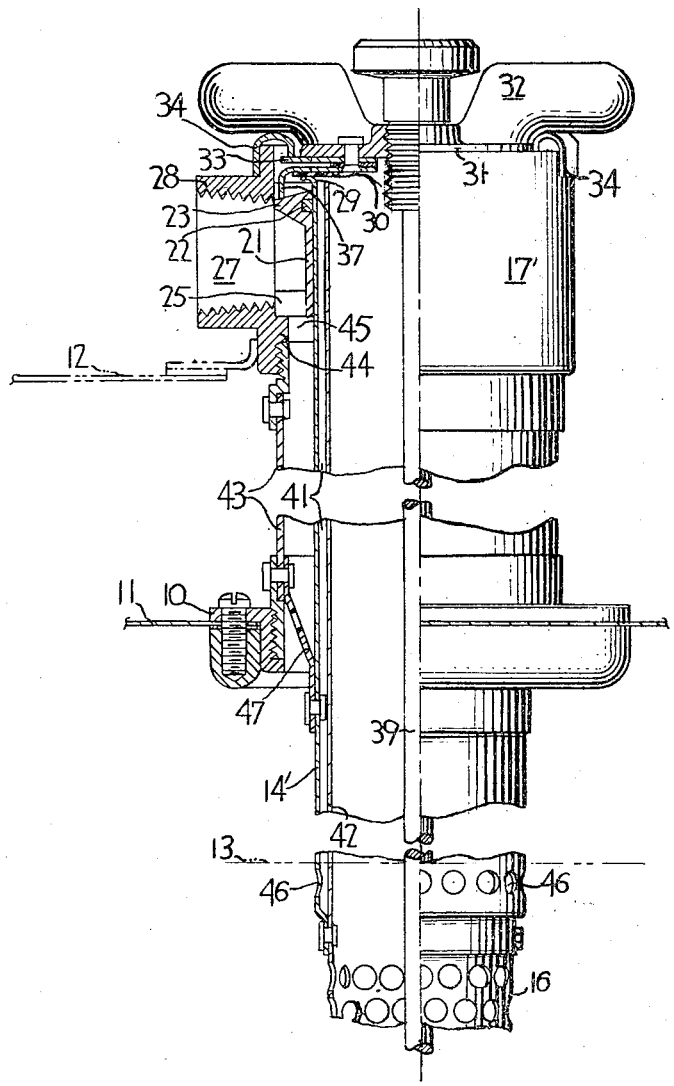
FIG-V

UNITED STATES PATENT OFFICE 2,340,286

TANK FILLER UNIT

Alonzo B. Storey, Jr., Glendale, and John C. Duffendack, Jr., North Hollywood, Calif., assignors to Lockheed Aircraft Corporation, Burbank, Calif.

Application April 22, 1940, Serial No. 331,004

3 Claims. (Cl. 220—86)

This invention relates to an improved form of filler neck and closure for an oil tank or the like wherein provisions for venting as well as expansion or foaming of the contents must be made.

Expansion and foaming of the contents can be taken care of by limiting the filling operation to provide an adequate air space above the maximum liquid level, as by placing the filler opening at the side of the tank so that oil will run out the filler when the desired level is reached. If such an installation involves a nearly horizontal position of a portion of the filler neck, the filling operation will be materially slowed down, especially under cold weather conditions. It will be evident that if the tank is permanently vented from the air space so provided above the liquid level, it would be impossible to use pressure methods for filling, and still prevent overfilling beyond the desired liquid level. On the other hand, if the vent is taken below the desired level, to maintain an air trap in the upper part of the tank, any expansion of the liquid would waste a portion of the contents through such a vent.

It is accordingly an object of this invention to provide an improved filler neck for closed liquid receptacles or tanks, the filler being so arranged that entering fluid will not flow therethrough after a predetermined liquid level has been reached, thus providing for any desired reserve volume to care for expansion or foaming of the contents of the tank. Such an arrangement is highly desirable since the operator filling the tank is not required to stop and measure the contents at intervals, or to rely upon some form of gage, the accuracy of which may be affected by numerous factors.

A further important object of this invention is to provide an improved vent or pressure connection to the air space above the desired liquid level. Some sort of vent is necessary to permit liquid to flow from the tank to the place of use, whether the tank operates under gravity or pressure feed. We provide an improved operating vent for this purpose that connects to the air space, and is automatically shut off by the operation of opening the filler neck for the addition of liquid to the tank, so that the desired expansion volume is converted into a sealed air trap which cooperates with the improved filler neck to prevent overfilling even though liquid is supplied thereto under a gravity or pressure head exceeding the elevation of the top of the tank. In order to permit addition of liquid to the tank, up to the desired level, while the operating vent is closed, the air displaced by the incoming liquid is either permitted to escape through the filler opening, or special venting arrangements may be made therefor to increase the rapidity of flow of the incoming liquid.

Another object of this invention is to provide an improved and simplified tank filler and vent combination wherein the act of removing the filler cap automatically changes the venting arrangement in such a way as to define an air lock or expansion space in the upper part of the tank, which space is protected from the inflow of liquid while the filler is open, but is available for expansion of the liquid without loss thereof through the vent when the filler opening is sealed.

Still a further object of this invention is to provide a measuring rod normally seated in the cap and withdrawn from the tank therewith, but capable of use independently of the cap during the filling operation, without affecting the calibration or indications given by the rod.

Another object of this invention is to provide an improved and self contained filler neck assembly that may extend to relatively inaccessible places, and be inserted in the tank as a unit, to render the actual filler opening readily accessible for routine refilling operations and gauging of the contents of the tank.

This invention is equally applicable to tanks of either the gravity or pressure feed types, whether forming a reserve supply, or being incorporated in a circulating system of an internal combustion engine.

Other and further important objects of this invention will be apparent from the disclosures in the specification and the accompanying drawings.

This invention (in two preferred forms) is illustrated in the drawings and hereinafter more fully described.

In the drawings:

Figure I is a vertical elevation, partly in section, showing one form embodying the features of my invention.

Figure II is a vertical elevation partly in section, of the vent valve shown in Figure I.

Figure III is a horizontal section of the line III—III of Figure I showing the valve control of the vent ports through the sleeve.

Figure IV is a top plan view of the closure and upper housing and is common to both Figures I and V.

Figure V is a vertical elevation, partly in section, showing another form embodying the features of my invention. In this figure a portion of the lower end of the central tube has been omitted and it is to be understood that it is substantially like the corresponding parts of Figure I.

As shown:

The two forms of filler necks shown in Figures I and V are designed to be inserted through a mounting flange 10 suitably sealed about an aperture in the top shell 11 of a liquid tank. The particular flange structure shown forms no part of this invention. The form of the invention disclosed in Figure V is designed to reach a tank rather inaccessibly placed within another enclosure 12, such for example as an airplane structure, the deck of a boat, or the body of an automobile. In the form shown in Figure I, venting of the tank, during the filling operation, follows a path separate from the inflowing liquid, while in Figure V the tank is then vented through the filler opening. In both forms the operating vent, after closing the filler cap, communicates with the air or expansion space above the liquid and the extended neck shown in Figure V is equally applicable to the disclosure of Figure I.

The structures of this invention are designed to limit the maximum liquid level 13 during filling, to a point substantially below the top 11 of the tank, in order to provide an expansion space for the liquid. The venting arrangements to be described hereinafter are intended to release pressure and prevent waste of the liquid should expansion or foaming occur to raise the general level of the liquid after the filling operation has been completed.

The structure of Figure I involves an inner cylindrical tube 14 which is preferably substantially closed at its lower end 15, a series of perforations 16 being provided in the walls of the tube, below the desired liquid level, to serve as a coarse strainer, and to minimize foaming if the liquid has such a tendency. A housing 17 is provided with mounting threads 18 to engage the tank flange 10, and carries a depending skirt or tube 19 spaced from the inner tube 14 and extending downwardly into the tank to the desired maximum oil level 13. Since the lower edge of the skirt 19 defines the oil level, if the filler neck is inserted in the tank at an angle from the vertical, or if the tank assumes an angular position such as might arise from the landing position of an airplane, the bottom of the skirt will be tailored to fit the resulting liquid surface.

The annular space 20 between the inner tube 14 and the upper part of the bore of the housing 17 contains a valve 21 rotatably mounted about the inner tube 14 and sealed thereto by packing 22, the valve being supported in position by an upper flange 23 and carrying a lower flange 24 making contact with the inner surface of the skirt 19. As will be explained elsewhere, the valve is given a rotary movement of approximately 45°, and the lower flange 24 is symmetrically notched as at 25 any desired even number of times, as required by the vent area necessary, the only limitation being that there be sufficient individual areas of land or solid flange to seal each of a corresponding number of perforations 26 in the skirt when the valve is rotated to one extreme, while the notches uncover the perforations at the other extreme of valve motion. A vent connection 27 is provided in a boss 28 on the housing, so that when the skirt perforations line up with the valve notches, the expansion space in the upper part of the tank is in communication with the vent connection 27. The notches 25 also connect the interior 20 of the skirt 19 to the vent 27, so that if the valve 21 is turned to cause the lower flange 24 to seal the perforations 26, it will be evident that the tank is rendered air tight except for the skirt passage 20 and the central filler opening, and as soon as the liquid level rises to contact the skirt, the tank volume above that level becomes air bound, preventing further addition of liquid to the tank, any further flow of liquid being discharged through the vent, or backing up and overflowing the mouth of the filler tube 14.

The upper or outer end of the inner tube 14 is flared out and over the top of the valve flange 23 to provide a smooth seat 29 for a gasket 30 carried by a closure member or cap 31 which fits into the top of the housing bore. The cap is provided with operating handles 32 and a locking plate having outstanding lugs 33 which engage under cam-like clips 34, to force the cap and gasket down into resilient sealing engagement with the spun seat 29 formed on the tube 14, the clips having a slot 35 admitting the lugs 33 and stops 36 defining the seated position. The cap also carries an operating plate having projecting and down turned lugs 37 which enter slots 38 milled in the top surface of the valve flange 23. With this arrangement the rotary movement of the cap necessary to unlock and free it from the clips 34 also rotates the valve 21 to a corresponding extent, causing the lower flange on the valve to seal the perforations 26 in the skirt. Contrawise, replacing the cap also engages the lugs 37 in the valve slots 38, and rotation of the cap to its stop 36 rotates the valve to uncover the skirt perforations, thus venting the air space.

The cap 31 is shown as centrally threaded for a measuring rod 39 which is provided with a collar 40 in proximity to an aperture for the rod provided in the lower end of the inner tube, so that the rod can be used to measure the contents of the tank either through the cap or independently thereof during the filling operation, as in the latter case the collar 40 serves as a locating point.

The cap 31 and its operating connection to the vent valve is identical in both forms of the invention shown, so that the same reference numerals have been applied in both figures to parts common thereto.

That form of this invention shown in Figure V differs from the foregoing in that venting of the tank during the filling operation takes place through an annular space 41 provided between an intermediate tube 14' and an inner tube 42, the spun over-gasket engaging upper seat 29 being retained on the intermediate tube 14', which corresponds in function to the tube 14 of Figure I. Also, the design provides for an upstanding neck above the tank, to render the filling opening accessible when the tank is enclosed in another structure. In this case a outer tube 43 serves as a space between the tank flange 10 and a housing 17' modified only to screw on the tube 43, and to provide an internal shoulder 44, to support the valve, the shoulder being notched at 45 to correspond to the notches 25' in the valve flange 24', the valving effect being produced between the shoulder 44 and the flange 24' so that the upper part of the tank is vented through the outer sleeve 43 when the cap is seated and rotated against its stop, but is air bound when the cap is removed, except for venting through ports 46 into the intermediate tube 14'. Thus the perforations in the intermediate tube 14' determine the maximum level to which the tank can be filled.

The inner tube 42 is supported near the lower end of the intermediate tube 14', which in turn is supported near the lower end of the outer tube 43 by means of a tapered, perforated tube 47 which holds the inner tube in alignment to avoid bending the valve and also holds the valve against its seat on the shoulder 44. This tapered tube would also be advantageous in the structure of Figure I if the length of the skirt 19 justified its use.

While it is to be noted that our invention has been described in connection with vertical necks, many installations require an angular or offset mounting, which would not affect the operation of our device but might necessitate rearrangement of the perforations in the tube or the edge of the skirt, to correspond to the liquid line in the tank relative to the axis of the filler, if the latter was otherwise than normal to the surface.

While the operation of the devices of our invention have been indicated in connection with the general description thereof, it will be convenient to summarize the same at this point. In that form of the invention shown in Figure I, when the cap is seated against its stop, the valve 21 is so turned as to uncover the ports 26 in the skirt 19 and thus vent the upper part of the tank. When the cap is turned sufficiently to release it from the clip the valve has been turned into a position to seal the ports 26, so that the tank is vented, during the filling operation, through the space between the tube 13 and the skirt 19, and when the latter is immersed in the liquid the remainder of the airspace in the tank becomes airbound. The alternative form of Figure V likewise vents the tank airspace through the outer tube 43 when the cap is seated and closes this vent when the cap is removed. The inner tube 42 serves to separate the air flow from the tank from the incoming liquid, during the filling operation, and can be omitted if this refinement is not desired, as without the inner tube 42, tube 14' would function as both vent and filler opening.

It will be noted that the filler connections of our invention are equally usable with storage, reserve or circulating liquid reservoirs of either the gravity or pressure flow type, as the filler of our invention is independent of other tank connections, and the vent described herein can be used either as a vent or pressure connection, with only minor modifications required to release the excess pressure on the tank prior to opening the filler.

It will thus be seen that we have invented an improved and simplified filler neck for the purposes described that is adapted to automatically maintain, during the filling operation, an expansion space in a closed receptacle, and to vent said space when the filler is closed, to avoid loss of a portion of the liquid contents due to expansion or foaming thereof. If the expansion space was not vented near the top thereof any pressure built up in the airbound expansion space by expansion or foaming of the contents might eject and waste valuable liquid.

Having thus described our invention and the present preferred embodiments thereof, we desire to emphasize the fact that many modifications may be resorted to in a manner limited only by a just interpretation of the following claims.

We claim:

1. The combination with a liquid containing tank, of a housing connected with the tank, said housing having a vent opening therein exterior of the tank, a skirt carried by the housing and depending into the tank, said skirt having perforations therein, a filling tube confined within the housing and skirt and spaced therefrom to provide an annular chamber affording communication between the perforations and vent opening, a tubular valve in the chamber between the perforations and filling tube, said valve being rotatable on the filling tube, and means for rotating the valve on the filling tube to alternately cut-off and afford communication between the perforations and vent opening through said chamber.

2. The combination with a liquid containing tank, of a housing connected with the tank and having a vent opening therein exterior of the tank, a tubular skirt carried by the housing and depending into the tank, said skirt having perforations therein adjacent the upper wall of the tank for disposition above the liquid level of the tank, a filling tube confined within the housing and skirt and spaced therefrom to provide an annular chamber affording communication between the vent opening and perforations, a tubular valve in said chamber and rotatable on the filling tube, a flange on the valve between the perforations and filling tube and having notches therein, a cap for the housing, and means connecting the cap and valve to bring the notches into and out of registration with the perforations upon rotation of the cap.

3. The combination with a liquid containing tank, of a housing connected with the tank, said housing having a vent opening exterior to the tank, a skirt carried by the housing and depending into the tank, said skirt having perforations therein adjacent the top wall of the tank, a filling tube confined within the housing and skirt and spaced therefrom to provide an annular chamber, a sleeve valve between the skirt and tube and rotatably engaged on said tube, and means carried by the valve adjacent the perforations of the skirt to alternately cut-off and afford communication between said perforations and vent openings upon rotation of the valve, and means for rotating the valve.

ALONZO B. STOREY, Jr.
JOHN C. DUFFENDACK, Jr.